No. 732,074. PATENTED JUNE 30, 1903.
E. P. HAYES.
BELT SHIFTER.
APPLICATION FILED AUG. 9, 1902.
NO MODEL.
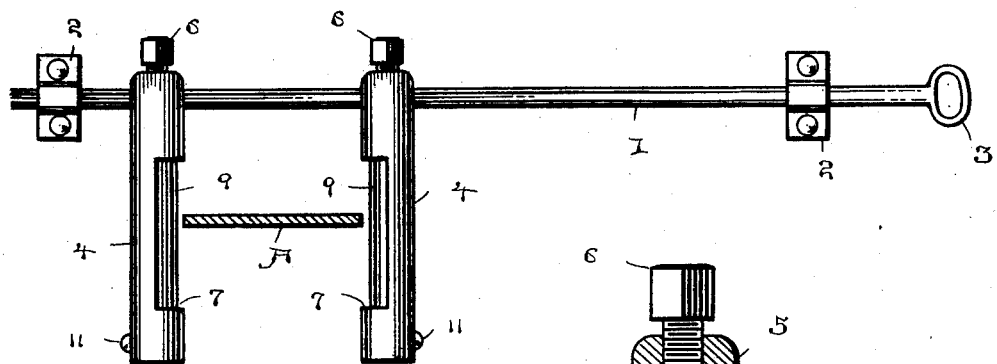
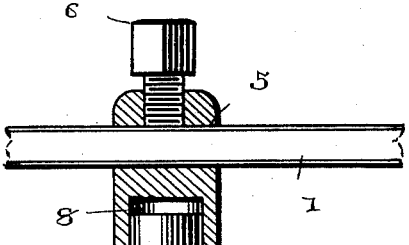
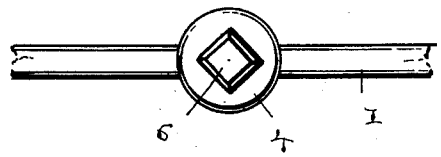
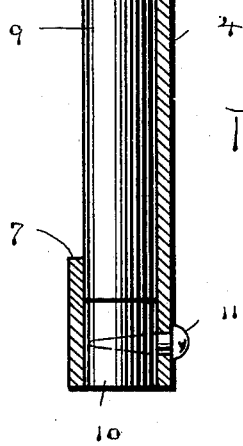
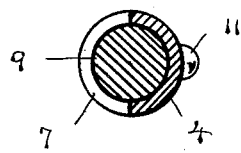
Witnesses
Inventor
Edwin P. Hayes.
By Victor J. Evans
Attorney.

No. 732,074.

Patented June 30, 1903.

UNITED STATES PATENT OFFICE.

EDWIN P. HAYES, OF TOWER, MICHIGAN.

BELT-SHIFTER.

SPECIFICATION forming part of Letters Patent No. 732,074, dated June 30, 1903.

Application filed August 9, 1902. Serial No. 119,072. (No model.)

*To all whom it may concern:*

Be it known that I, EDWIN P. HAYES, a citizen of the United States, residing at Tower, in the county of Cheboygan and State of Michigan, have invented new and useful Improvements in Belt-Shifters, of which the following is a specification.

My invention has relation to new and useful improvements in belt-shifters; and the object of the invention is to provide a device of the character mentioned which will be of an improved and simplified construction, which may be readily adjusted to permit its being employed in connection with belts of different widths, and which will be so constructed as to reduce to a minimum the liability of injury or wear to the belt by its engagement therewith.

I attain the objects above set forth in the construction to be more fully described hereinafter, and the novelty of which will be particularly pointed out and distinctly claimed.

I have fully and clearly illustrated my invention in the accompanying drawings, wherein—

Figure 1 is a view in elevation of a complete device constructed in accordance with my invention and a belt in cross-section in connection with which the invention is employed. Fig. 2 is an enlarged vertical longitudinal section through one of the shifting brackets. Fig. 3 is a top plan view of one of the shifting brackets. Fig. 4 is a transverse sectional view taken through one of the shifting brackets.

Referring to the drawings, 1 designates an operating member or rod, made of such length and strength as may be desired or as may be required to accomplish the purposes for which it is employed. This operating member is slidingly mounted in brackets or guideways 22, which are securely bolted or otherwise fastened to any suitable support and being of any desired form of construction. At one end the operating member is provided with a handle 3, adapted to be grasped by the operator when it is desired to actuate the device to shift the belt.

4 4 designate oppositely-arranged hangers or shifting brackets, the upper portions of which are provided with transverse apertures 5, through which the operating member is projected and to which the said shifting brackets are slidably and adjustably secured. In order that the said brackets may be securely held in their adjusted position, I provide a fastening-screw 6, which is let through the upper portion of the bracket and engages the operating-rod in a well-known manner.

The shifting brackets above mentioned are formed upon their inner faces with elongated openings 7 7, extending for a greater portion of their length, and which open into cylindrical seats 8, constituting housings, wherein are journaled longitudinally-disposed antifriction-rollers 9, adapted to bear against the edges of the belt when the same is shifted, and thereby obviate the wear which would otherwise take place in the movements thereof. These antifriction-rollers are secured in the housings by means of a closing-plug 10, inserted in the bore of the bracket beneath the rollers and held in position by means of a screw 11, let through the wall of the bracket and projecting into the said plug. It will thus be seen that in case the rollers become worn or unserviceable they may be readily removed from the housing and new ones supplied.

As shown in Fig. 1, the shifting brackets are so arranged and secured on the operating member as to project laterally therefrom and are spread apart a sufficient distance to allow the belt A to travel freely therebetween. If it should become necessary to employ the device in connection with belts of different widths or under any other circumstances to increase or diminish the space between the shifting brackets, the said brackets may be released from rigid connection with the operating member and moved along said member until the desired space for the belt is obtained, when they may again be secured in position by the fastening-screws above referred to. It will thus be seen that the brackets are rendered adjustable with relation to each other and, as stated, the space therebetween may be regulated to accommodate belts of various widths.

Having thus fully described the invention, what is claimed as new is—

In a belt-shifter, the combination with a longitudinally-slidable operating-rod, of duplicate shifting brackets arranged independently of each other, each of said brackets consisting of a cylindrical body having a solid upper portion formed integral therewith and having a transverse aperture therethrough whereby said bracket is slidably mounted upon the operating-rod, and a set-screw let through the solid portion and engaging the rod to hold the bracket in position, the lower portion of said bracket being formed with a longitudinal central bore to provide a housing, said bore opening through the bottom of the bracket, there being an elongated opening in the bracket communicating with the bore, a cylindrical antifriction-roller journaled in the housing and projecting through the elongated opening, a cylindrical plug inserted in the bore beneath the roller to hold said roller in position and a screw let through the bracket and engaging the plug.

In testimony whereof I affix my signature in presence of two witnesses.

EDWIN P. HAYES.

Witnesses:
FRANK B. KELLEY,
E. M. FETTEROLF.